United States Patent
Xie et al.

(10) Patent No.: US 10,886,855 B2
(45) Date of Patent: Jan. 5, 2021

(54) RESONANT CONVERTERS POWER SUPPLIES AND CONTROL METHODS FOR REDUCING UNBALANCED CURRENTS IN RESONANT CONVERTER POWER SUPPLIES

(71) Applicant: Astec International Limited, Kowloon (HK)

(72) Inventors: Yongtao Xie, Shunde (CN); Zhanwu Wang, Shenzhen (CN); Sudhakarababu Chakkirala, Pasig (PH)

(73) Assignee: Astec International Limited, Kowloon (HK)

( * ) Notice: Subject to any disclaimer, the term of this patent is extended or adjusted under 35 U.S.C. 154(b) by 121 days.

(21) Appl. No.: 16/086,245

(22) PCT Filed: Dec. 12, 2017

(86) PCT No.: PCT/CN2017/115697
§ 371 (c)(1),
(2) Date: Sep. 18, 2018

(87) PCT Pub. No.: WO2019/113784
PCT Pub. Date: Jun. 20, 2019

(65) Prior Publication Data
US 2020/0161982 A1   May 21, 2020

(51) Int. Cl.
*H02M 3/335*   (2006.01)
*H02M 1/08*   (2006.01)
*H02M 1/00*   (2006.01)

(52) U.S. Cl.
CPC ......... *H02M 3/33569* (2013.01); *H02M 1/08* (2013.01); *H02M 2001/0009* (2013.01)

(58) Field of Classification Search
CPC ............ H02M 3/335; H02M 3/33507; H02M 3/33523; H02M 3/33569; H02M 3/33576;
(Continued)

(56) References Cited

U.S. PATENT DOCUMENTS 5,986,895 A * 11/1999 Stewart ................. H02M 3/337
363/16
8,929,109 B2 * 1/2015 Chang ................. H02M 3/3376
323/267
(Continued)

FOREIGN PATENT DOCUMENTS

CN    203788153 U    8/2014
CN    204290729 U    4/2015
(Continued)

*Primary Examiner* — Yemane Mehari (57) ABSTRACT

According to some aspects of the present disclosure, resonant converter power supplies and control methods for reducing unbalanced currents in resonant power supplies are disclosed. Example resonant converter power supplies include an input, an output, a transformer, and a bridge circuit coupled between the input and a primary winding of the transformer. The power supply also includes first and second rectifier rails each coupled between a secondary winding of the transformer and the output, and at least one sensor coupled to generate an error signal representing unbalanced currents in the first and second rectifier ails. The power supply further includes a controller configured to receive the error signal, and adjust a duty cycle of at least one of a first switch and a second switch of the bridge circuit based on the error signal to reduce the unbalanced currents in the first and second rectifier rails.

21 Claims, 5 Drawing Sheets

(58) Field of Classification Search
CPC ........... H02M 1/14; H02M 2001/0009; H02M 2001/0032; H02M 2001/0058; H02M 2007/4815; Y02B 70/1433; Y02B 70/1441; Y02B 70/1475
USPC .......................................... 363/21.01–21.06
See application file for complete search history.

(56) References Cited

U.S. PATENT DOCUMENTS

| | | | | |
|---|---|---|---|---|
| 9,787,195 | B1* | 10/2017 | Xiong .................... | H05B 45/37 |
| 10,326,377 | B1* | 6/2019 | Xiong ................ | H02M 3/33569 |
| 2001/0054881 | A1* | 12/2001 | Watanabe ......... | H02M 3/33576 |
| | | | | 320/166 |
| 2002/0064058 | A1* | 5/2002 | Zhang ..................... | H02M 1/10 |
| | | | | 363/17 |
| 2005/0030767 | A1* | 2/2005 | Phadke ............... | H02M 3/3376 |
| | | | | 363/17 |
| 2011/0038182 | A1* | 2/2011 | Li ..................... | H02M 3/33592 |
| | | | | 363/21.06 |
| 2014/0112026 | A1* | 4/2014 | Pan ................... | H02M 3/33569 |
| | | | | 363/21.02 |
| 2016/0294296 | A1* | 10/2016 | Lee ................... | H02M 3/33592 |
| 2017/0317524 | A1* | 11/2017 | Yim ......................... | H02J 9/06 |
| 2018/0262116 | A1* | 9/2018 | Ouyang ............ | H02M 3/33546 |

FOREIGN PATENT DOCUMENTS

| | | |
|---|---|---|
| CN | 104836443 A | 8/2015 |
| CN | 105406719 A | 3/2016 |
| CN | 106787771 A | 5/2017 |
| CN | 106877673 A | 6/2017 |

\* cited by examiner

RESONANT CONVERTERS POWER SUPPLIES AND CONTROL METHODS FOR REDUCING UNBALANCED CURRENTS IN RESONANT CONVERTER POWER SUPPLIES

FIELD

The present disclosure relates to resonant converter power supplies and control methods for reducing unbalanced currents in resonant converter power supplies.

BACKGROUND

This section provides background information related to the present disclosure which is not necessarily prior art.

Rectified currents in secondary rails of a resonant converter may be unbalanced due to unbalanced leakage inductance of a transformer, an asymmetrical circuit arrangement of the converter, asymmetrical duty cycles of the converter, etc. These unbalancing factors can be caused by construction of the transformer, circuit layout of a printed circuit board (PCB), a tolerance of a controller, an operating limitation of the controller, etc. Different secondary rail currents will result in different power dissipation on windings of the transformer and on rectifier components, and can cause increased output voltage ripple.

Unbalanced currents may cause a high peak current on one secondary rail and can provide high current stress on a rectifier component of the secondary rail. The different power dissipation may cause hot spots in the converter. Higher output voltage ripple requires increased output capacitance for filtering, to avoid failure of meeting specification requirements of the converter. Moreover, unbalanced secondary rail currents have a negative impact on efficiency.

SUMMARY

This section provides a general summary of the disclosure, and is not a comprehensive disclosure of its full scope or all of its features.

According to one aspect of the present disclosure, a resonant converter power supply includes an input for receiving an input voltage from a voltage source, an output for providing an output voltage to a load, a transformer having a primary winding and a secondary winding, and a bridge circuit coupled between the input and the primary winding of the transformer. The bridge circuit includes a first switch and a second switch. The power supply also includes a first rectifier rail coupled between the secondary winding of the transformer and the output, a second rectifier rail coupled between the secondary winding of the transformer and the output, and at least one sensor coupled to generate an error signal representing unbalanced currents in the first rectifier rail and the second rectifier rail. The power supply further includes a controller configured to receive the error signal, and adjust a duty cycle of at least one of the first switch and the second switch based on the received error signal to reduce the unbalanced currents in the first rectifier rail and the second rectifier rail.

According to another aspect of the present disclosure, a method for reducing unbalanced currents in a resonant converter power supply is disclosed. The power supply includes an input for receiving an input voltage from a voltage source, an output for providing an output voltage to a load, a transformer having a primary winding and a secondary winding, and a bridge circuit coupled between the input and the primary winding of the transformer. The bridge circuit includes a first switch and a second switch. The power supply also includes a first rectifier rail coupled between the secondary winding of the transformer and the output, a second rectifier rail coupled between the secondary winding of the transformer and the output. The method includes sensing unbalanced currents in the first rectifier rail and the second rectifier rail, generating an error signal representing the sensed unbalanced currents in the first secondary rail and the second rectifier rail, and adjusting a duty cycle of at least one of the first switch and the second switch based on the error signal to reduce the unbalanced currents in the first rectifier rail and the second rectifier rail.

Further aspects and areas of applicability will become apparent from the description provided herein. It should be understood that various aspects and features of this disclosure may be implemented individually or in combination with one or more other aspects or features. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding features throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a", "an", and "the" may be intended to include the plural forms as well, unless the context clearly indicates otherwise.

The terms "comprises", "comprising", "including", and "having" are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first", "second", and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner", "outer", "beneath", "below", "lower", "above", "upper", and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 1:
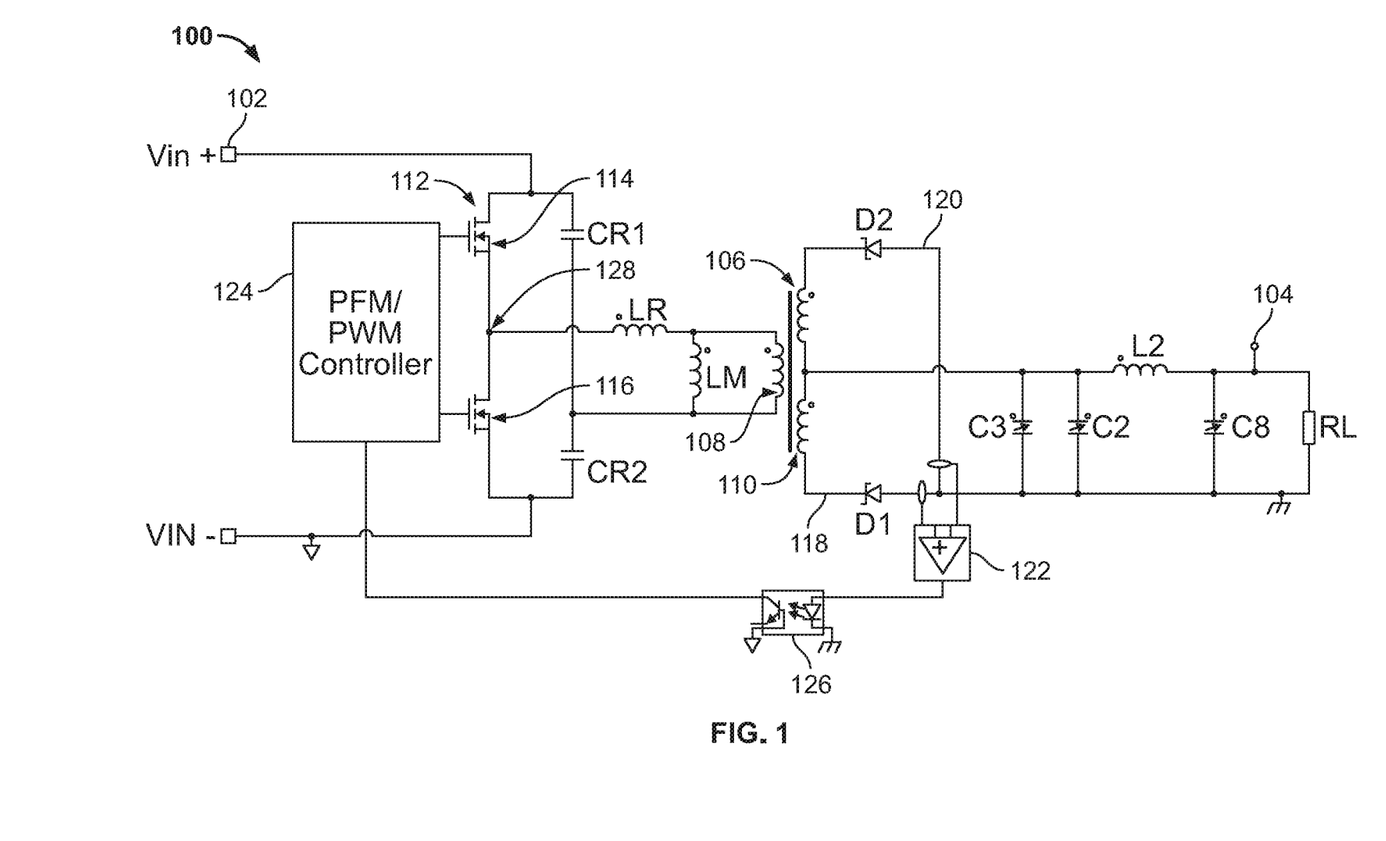
FIG. 1 is a circuit diagram of a resonant converter power supply according to one example embodiment of the present disclosure.

A resonant converter power supply according to one example embodiment of the present disclosure is illustrated in FIG. 1 and indicated generally by reference number 100. As shown in FIG. 1, the resonant converter power supply 100 includes an input 102 for receiving an input voltage from a voltage source Vin+, and an output 104 for providing an output voltage to a load RL.

The power supply 100 further includes a transformer 106 having a primary winding 108 and a secondary winding 110. A bridge circuit 112 is coupled between the input 102 and the primary winding 108 of the transformer 106. The bridge circuit 112 includes a first switch 114 and a second switch 116.

A first rectifier rail 118 is coupled between the secondary winding 110 of the transformer 106 and the output 104, and a second rectifier rail 120 is coupled between the secondary winding 110 of the transformer 106 and the output 104.

The power supply 100 also includes a sensor 122 coupled to generate an error signal representing unbalanced currents in the first rectifier rail 118 and the second rectifier rail 120, and a controller 124 coupled to receive the error signal. The controller 124 is configured to adjust a duty cycle of at least one of the first switch 114 and the second switch 116 based on the received error signal, to reduce the unbalanced currents in the first rectifier rail 118 and the second rectifier ail 120.

Unbalanced currents in the first rectifier rail 118 and the second rectifier rail 120 can result in different power dissipations on the transformer windings 108 and 110, and the rectifier rails 118 and 120, and may increase output voltage ripple.

The unbalanced currents occur when a current through the first rectifier rail 118 is different than a current through the second rectifier rail 120. The unbalanced currents may be caused by unbalanced leakage inductance of the transformer 106, asymmetrical circuit layout of the power supply 100, asymmetrical duty cycles due to controller tolerance in the power supply 100, etc.

As one example, if the second rectifier rail 120 has a greater leakage inductance than the first rectifier rail 118 (e.g., due to unbalanced leakage inductance in the secondary windings 110 of the transformer 106, etc.), then the increased leakage inductance of the second rectifier rail 120 will act in series with a primary resonant inductance on the primary side of the power supply 100 to provide a different resonant frequency. As one example, the leakage inductance of the second rectifier rail 120 may be about 50 nH greater than the leakage inductance of the first rectifier rail 118.

The resonant frequency (fr) is determined by the resonant inductance (L) and resonant capacitance (C) according to $fr=1/(2*\pi*sqrt(L*C))$. Given a transformer turn ratio of Np:Ns1:Ns2=32:2:2 with a magnetized inductance of 805 uH, a resonant inductance of 115 uH, and a resonant capacitance of 22 nF, the resonant frequency of the power supply 100 when the first rectifier rail 118 is conducting (about 95 KHz as an example) may be lower than the resonant frequency of the power supply 100 when the second rectifier rail 120 is conducting (about 100 KHz as an example).

The different resonant frequencies of the power supply 100 during respective conduction times of the first rectifier rail 118 and the second rectifier rail 120 will result in unbalanced currents in the first rectifier rail 118 and the second rectifier rail 120. Continuing with the example, the peak current in the first rectifier rail 118 will be lower than the peak current in the second rectifier ail 120 (e.g., about 3.7 amperes lower), because a lower resonant frequency corresponds to a lower current and vice versa.

The controller 124 is configured to reduce the unbalanced currents in the first rectifier rail 118 and the second rectifier rail 120 by adjusting the duty cycle of at least one of the first switch 114 and the second switch 116, which may be considered as adjusting the duty cycle of a switching node 128 (e.g., a voltage of the half bridge (VHB) node, etc.). Although FIG. 1 illustrates the controller 124 as a pulse frequency modulation (PFM) and/or pulse width modulation (PWM) controller, other embodiments may include other types of controllers.

Figure 2:
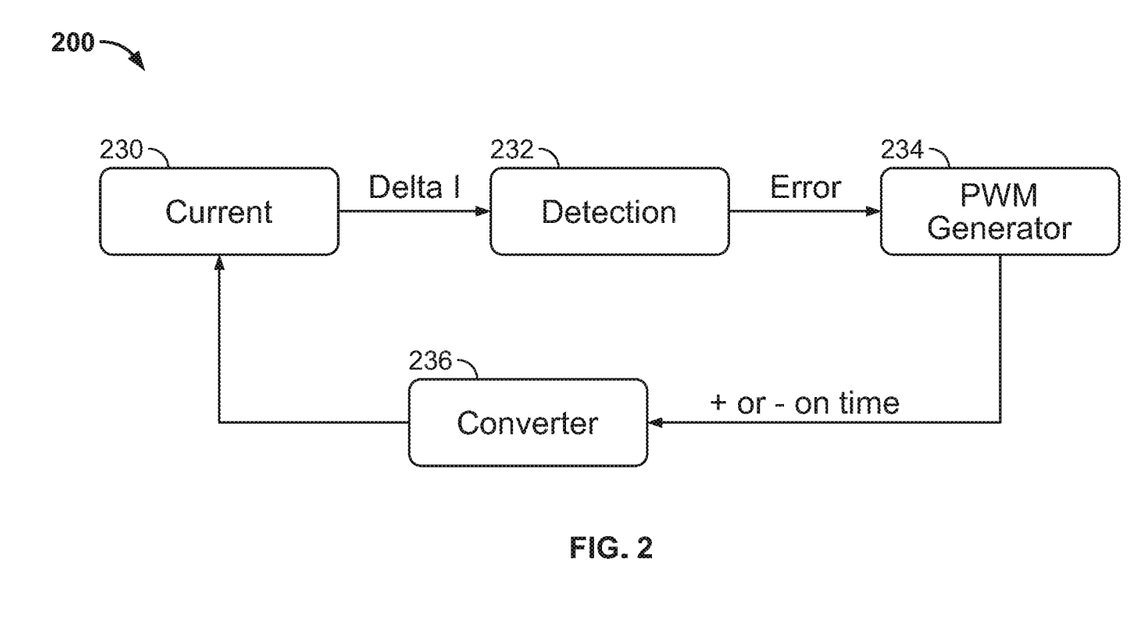
FIG. 2 is a block diagram of an example control loop for reducing unbalanced currents in the power supply of FIG. 1.

FIG. 2 illustrates an example control loop 200 that may be used to achieve automatic regulation of the unbalanced currents. For example, the control loop can sense the unbalanced currents at 230, using direct or indirect sensing methods as described further below.

A difference Delta I (e.g., an unbalanced condition) is detected at 232, and an error signal that represents the unbalanced currents in the first rectifier rail 118 and the second rectifier rail 120 is generated. A PWM generator (e.g., in the controller 124) receives the error signal at 234, and adjusts the duty cycle (e.g., by increasing or decreasing on time) of one or both of the switches 114 and 116 according to the error signal at 236.

For example, the duty cycle of one of the switches 114 and 116 may be adjusted by adding an offset to the on time of the switch. The amount of offset added may be based on the level of the sensed unbalanced currents, as represented by the error signal.

This adjusts the duty cycle of the switching node 128 of the resonant converter power supply 100 to facilitate balancing of the currents in the first rectifier rail 118 and the second rectifier rail 120. The control loop 200 then continues to sense the unbalanced currents at 230 and repeats adjustment of the duty cycle of one or both of the switches 114 and 116 according to the error signal at 236, as necessary.

In an ideal condition, a 50% duty cycle on each switch 114 and 116 (e.g., a 50% duty cycle on the VHB node 128) would produce balanced currents in the first rectifier rail 118 and the second rectifier rail 120. Adjusting the duty cycle to increase the duty cycle of switch 114 relative to switch 116 can adjust the currents in each rail 118 and 120, because smaller duty cycles correspond to higher currents and vice versa.

If both switches 114 and 116 are operated with equal on times (using 5.03 us as an example), the current in the first rectifier rail 118 and the second rectifier rail 120 may be balanced. Increasing the on time of switch 114 (e.g., to 5.17 us), while decreasing the on time of switch 116 (e.g., to 4.89 us), may unbalance the currents so that the current in the first rectifier rail 118 is less than the current in the second rectifier rail 120.

Therefore, it is possible to adjust the duty cycle of switches 114 and/or 116 to compensate for factors that cause unbalanced currents (e.g., asymmetrical power supply factors, etc.), by reducing the duty cycle of a switch corresponding to a rectifier rail having a lower resonant frequency and current, and/or increasing a duty cycle of a switch that corresponding to a rectifier ail having a higher resonant frequency and current.

Referring again to FIG. 1, the controller 124 is configured to control switching operation of the first switch 114 and second switch 116, including turn on and turn off of the switches 114 and 116, duty cycles of the switches 114 and 116, etc.

In some embodiments, the controller 124 may adjust both the duty cycle of the first switch 114 and the duty cycle of the second switch 116 based on the received error signal, in order to reduce the unbalanced currents in the first rectifier rail 118 and the second rectifier rail 120. In this case, the duty cycle of a switch corresponding to a lower current rectifier rail may be decreased, while the duty cycle of a switch corresponding to a higher current rectifier rail may be increased.

In other embodiments, the controller 124 may adjust the duty cycle in only one of the first switch 114 and the second switch 116 based on the received error signal, in order to reduce the unbalanced currents in the first rectifier rail 118 and the second rectifier rail 120.

For example, in this case the controller 124 may only decrease the duty cycle of a switch corresponding to a lower current rectifier rail, while leaving the duty cycle of the other switch unchanged. This can create a small dead time period between the on times of driver signals for the two switches 114 and 116.

As described above, in an ideal case a 50% duty cycle for each switch would cause balanced currents in the first rectifier rail 118 and the second rectifier ail 120. Therefore, before adjusting the duty cycle of at least one of the switches 114 and 116, the controller 124 may be configured to operate the first switch 114 and the second switch 116 with substantially identical duty cycles. The controller 124 can then adjust the duty cycles as necessary based on sensed unbalanced currents.

As shown in FIG. 1, the sensor 122 is coupled to sense a peak rectified current of the first rectifier rail 118, and a peak rectified current of the second rectifier rail 120. In this case, the error signal provided to the controller 124 includes a difference between the respective sensed peak rectified currents of each rectifier rail 118 and 120. This may be considered as a direct current measurement method.

Figure 3:
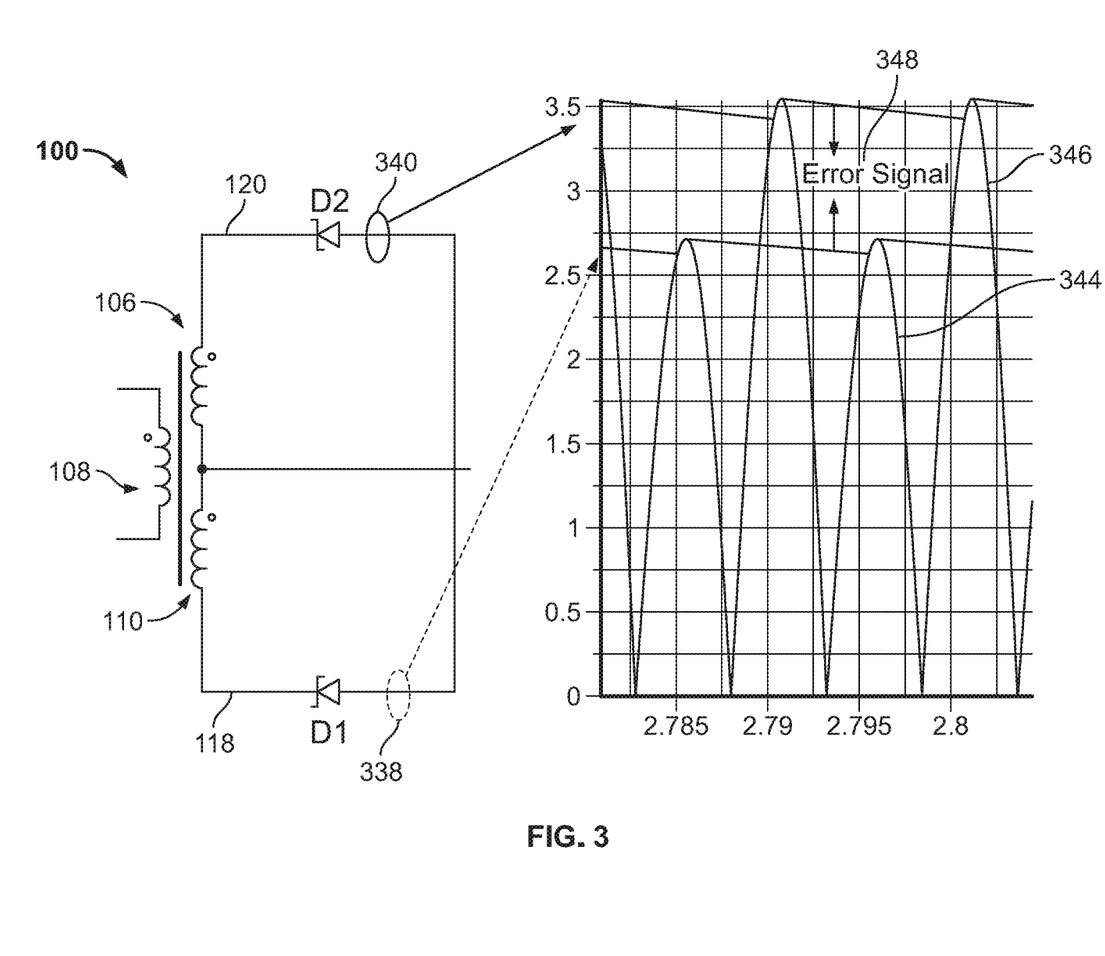
FIG. 3 is a waveform illustrating example current measurements for the rectifier rails of the power supply of FIG. 1.

FIG. 3 illustrates example sensed current values in the first and second rectifier rails 118 and 120. The sensor 122 senses the current in the first rectifier rail 118 at node 338, and senses current in the second rectifier rail 120 at node 340.

The waveform in FIG. 3 shows that the peak value of the rectified current 344 in the first rectifier ail 118 is lower than the peak value of the rectified current 346 in the second rectifier rail 120. An error signal 348 is generated based on a difference between the peak rectified currents 344 and 346, and represents an unbalanced condition of the currents 344 and 346 in the first and second rectifier rails 118 and 120.

The controller 124 receives the error signal 348 from the sensor 122, and may adjust a duty cycle of the switches 114 and/or 116 to compensate for the sensed unbalanced currents in the rectifier rails 118 and 120. In this example, the controller 124 may reduce a duty cycle of the switch corresponding to the first rectifier rail 118 and/or increase a duty cycle of the switch corresponding to the second rectifier rail 120, in order to balance the currents in the rectifier rails 118 and 120.

As shown in FIG. 1, the sensor 122 is located on a secondary side of the power supply 100, and the controller 124 is located on a primary side of the power supply 100. Therefore, an optional isolator 126 may be coupled between the sensor 122 and the controller 124 to maintain isolation between the primary side of the power supply 100 and the secondary side of the power supply 100.

Figure 4:
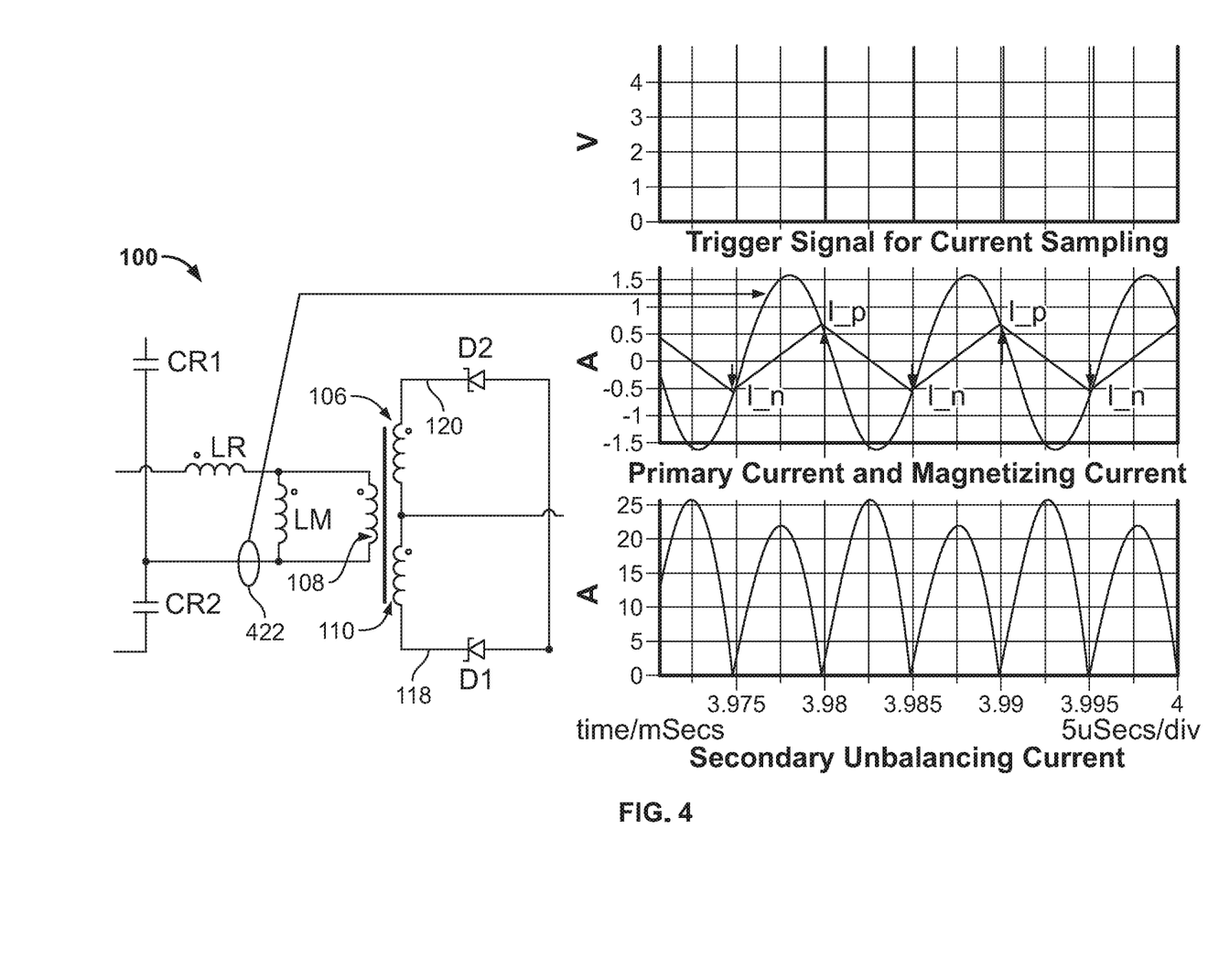
FIG. 4 is a waveform illustrating example current measurements of a primary winding of the transformer of FIG. 1.

FIG. 4 illustrates an indirect current sensing approach, where unbalanced current conditions are sensed on a primary side of the power supply 100. When there are unbalanced currents in the secondary side rectifier rails 118 and 120, a magnetizing current on the primary winding 108 of the transformer 106 will be asymmetrical. In that case, a direct current (DC) offset of the magnetizing current can be used as the error signal for adjusting duty cycles of the switches 114 and/or 116 to balance the secondary side currents. This approach may be considered as an indirect sensing method.

As shown in FIG. 4, a sensor 422 senses the primary current on the primary winding 108 of the transformer 106. The magnitude of the primary current near switch turn on is approximately equal to a positive magnitude of the magnetizing current I_p or a negative magnitude of the magnetizing current I_n. A trigger signal for sensing the magnetizing current I_p/I_n may occur at the same time as turn on of switch 114 and switch 116.

In some embodiments a specified delay of the trigger signal may be used for noise blanking, and/or to reduce an impact of a load current when the switching frequency of the power supply 100 is greater than a resonant frequency of the power supply 100.

In this indirect sensing method, the error signal used for feedback control (e.g., to adjust duty cycles of the switches 114 and/or 116), is the difference between the absolute value of the positive magnitude of the magnetizing current I_p and the absolute value of the negative magnitude of the magnetizing current I_n.

The direct sensing method illustrated in FIG. 3 can provide increased accuracy by directly sensing relative peak currents of in the rectifier rails 118 and 120, but may use additional current sensing circuit elements. In addition, the error signal may be transmitted to the primary side of the power supply 100 if the controller 124 is located on the primary side of the power supply 100.

The indirect sensing method illustrated in FIG. 4 reduces the need to address primary and secondary side isolation of the power supply 100, any may not require any additional hardware circuitry. Both the indirect sensing method and the direct sensing may be implemented in a digital signal processor (e.g., the controller 124). In some embodiments, the indirect sensing may be implemented with less complex circuitry, components, etc., as described above.

As should be apparent, one or more sensors 122, 422, etc., may be used to sense the unbalanced currents in the rectifier rails 118 and 120 directly and/or indirectly. Although FIGS. 1, 3 and 4 illustrate specific sensor configurations, other embodiments may include more or less sensors located at other positions on the primary and/or secondary sides of the power supply 100.

In one embodiment, the sensor includes a current transformer coupled on the primary side of the power supply 100. For example, a current transformer may be coupled to the primary winding 108 of the transformer 106, to sense a current through the primary winding 108.

As shown in FIG. 1, the power supply 100 is a resonant LLC converter including an inductor LR and two capacitors CR1 and CR2 coupled between the bridge circuit 112 and the primary winding 108 of the transformer 106. In other embodiments, the power supply 100 may include any other suitable resonant converter topologies, including more or less capacitors and inductors, capacitors and inductors connected in different circuit arrangements, etc.

The bridge circuit 112 includes a first switch 114 and a second switch 116 with a node 128 coupled between them. The bridge circuit 112 is a half bridge circuit, and the node 128 can be considered as a half bridge node. In other embodiments, other bridge circuits may be used (including a full bridge circuit), which may include more than two switches, more nodes between switches, etc. Although switches 114 and 116 are illustrated as field-effect transistors (FETs), other embodiments may include other suitable switching elements including bipolar junction transistors (BJTs), etc.

Each rectifier rail 118 and 120 on the secondary side of the power supply 100 includes a rectifying component. Specifically, the first rectifier rail 118 includes a rectifying diode D1 and the second rectifier rail includes a rectifying diode D2. In other embodiments, the rectifier rails may include more than one rectifying component, other types of rectifying components (e.g., synchronous rectifier switches), etc.

The controller 124 may be configured to perform operations using any suitable combination of hardware and software. For example, the controller 124 may include any suitable circuitry, logic gates, microprocessor(s), computer-executable instructions stored in memory, etc. operable to cause the controller 124 to perform actions described herein (e.g., adjusting duty cycles of the switches 114 and 116, etc.). In some embodiments, the controller 124 may include a digital signal processor (DSP).

Figure 5:
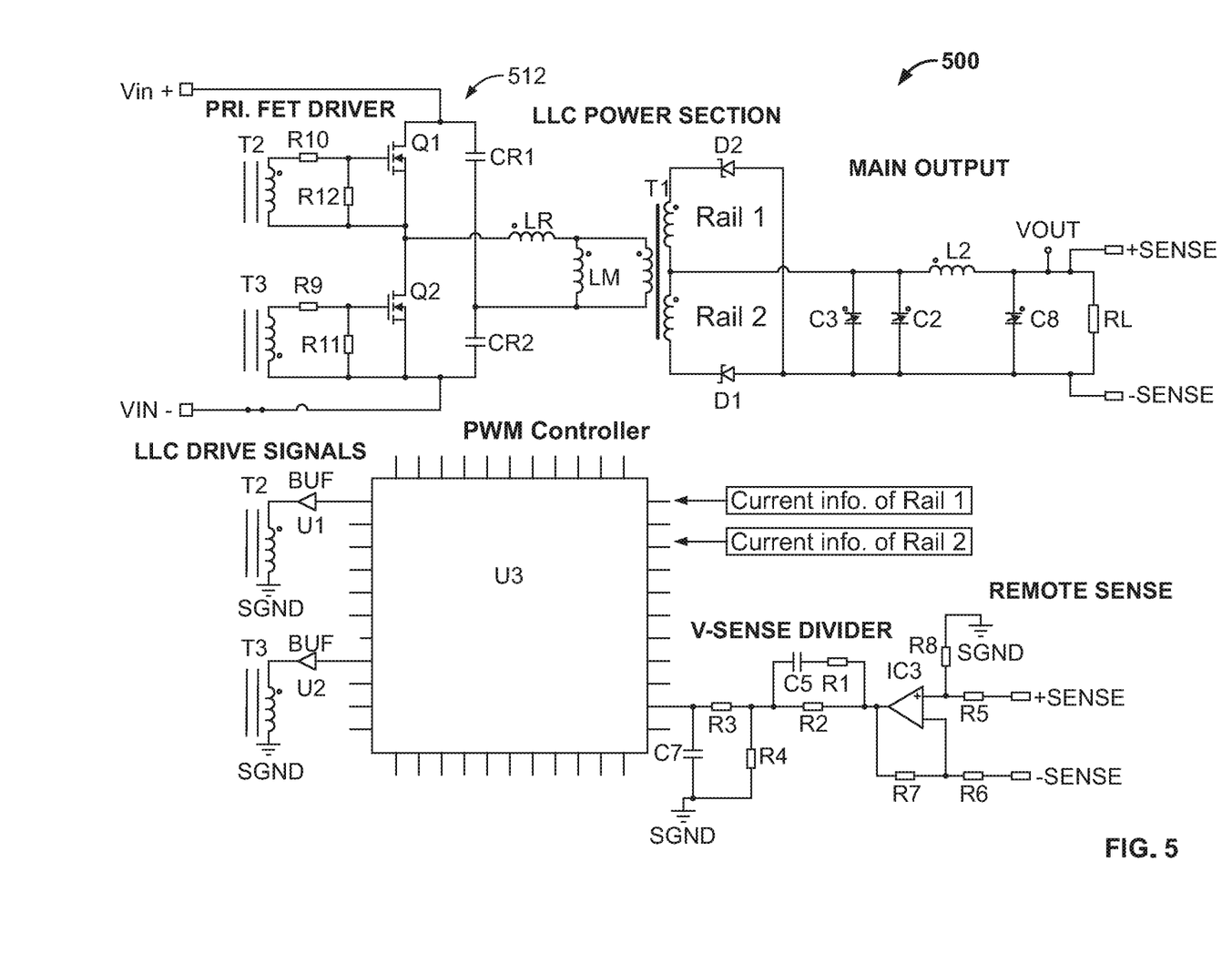
FIG. 5 is circuit diagram of a resonant converter power supply according to another example embodiment of the present disclosure.

FIG. 5 illustrates a resonant converter power supply 500 according to another example embodiment of the present disclosure. As shown in FIG. 5, the resonant converter power supply 500 includes an input for receiving an input voltage from a voltage source Vin+, and an output VOUT for providing an output voltage to a load RL.

The power supply 500 further includes a transformer T1 having a primary winding and a secondary winding. A bridge circuit 512 is coupled between the input 102 and the primary winding of the transformer T1. The bridge circuit 512 includes a first switch Q1 and a second switch Q2.

A first rectifier rail (Rail 1) is coupled between the secondary winding of the transformer T1 and the output VOUT and includes a rectifying diode D1. A second rectifier rail (Rail 2) is coupled between the secondary winding of the transformer T1 and the output VOUT and includes a rectifying diode D2.

The power supply 500 also includes a PFM/PWM controller U3 configured to receive sensed current information of the first rectifier rail and the second rectifier rail. The PFM/PWM controller U3 is configured to adjust a duty cycle of at least one of the first switch Q1 and the second switch Q2 based on the received error signal, to reduce the unbalanced currents in the first rectifier rail and the second rectifier rail.

According to another aspect of the present disclosure, an exemplary method for reducing unbalanced currents in a resonant converter power supply is disclosed. The power supply includes an input for receiving an input voltage from a voltage source, an output for providing an output voltage to a load, a transformer having a primary winding and a secondary winding, and a bridge circuit coupled between the input and the primary winding of the transformer. The bridge circuit includes a first switch and a second switch. The power supply also includes a first rectifier ail coupled between the secondary winding of the transformer and the output, and a second rectifier rail coupled between the secondary winding of the transformer and the output.

The method includes sensing unbalanced currents in the first rectifier rail and the second rectifier rail, generating an error signal representing the sensed unbalanced currents in the first secondary rail and the second rectifier rail, and adjusting a duty cycle of at least one of the first switch and the second switch based on the error signal to reduce the unbalanced currents in the first rectifier rail and the second rectifier rail.

Adjusting the duty cycle may include adjusting the duty cycle of only one of the first switch and the second switch based on the error signal to reduce the unbalanced currents in the first rectifier rail and the second rectifier rail.

Alternatively, adjusting the duty cycle may include adjusting both the duty cycle of the first switch and the duty cycle of the second switch based on the error signal to reduce the unbalanced currents in the first rectifier rail and the second rectifier rail.

In some embodiments, prior to adjusting the duty cycle of at least one of the switches, the method may include operating the first switch and the second switch with substantially identical duty cycles.

Sensing the unbalanced currents may include sensing a peak rectified current of the first rectifier rail and a peak rectified current of the second rectifier rail. In this case, the error signal includes a difference between the respective sensed peak rectified currents of each rectifier rail.

Alternatively, sensing the unbalanced currents may include sensing a magnetizing current of the primary winding of the transformer. In this case, the error signal includes a DC offset (e.g., DC bias) of the sensed magnetizing current of the primary winding of the transformer. Further, the sensing may include measuring a magnitude of the magnetizing current of the primary winding of the transformer at a specified delay period after turn on of at least one of the first switch and the second switch.

Any of the example embodiments and aspects disclosed herein may be used in any suitable combination with any other example embodiments and aspects disclosed herein without departing from the scope of the present disclosure. For example, resonant converter power supplies described herein may be operated using other control methods, control methods described herein may be used with other resonant converter power supplies, etc., without departing from the scope of the present disclosure.

Example embodiments and aspects of the present disclosure may provide any one or more (or none) of the following advantages: improved balancing of secondary side rectified currents in a resonant converter, reduction of current stress on secondary rectifiers due to unbalanced currents, reduction of hot spots (e.g., overheated portions) of the rectifiers due to unbalanced currents, reduction of output voltage ripple, increased converter efficiency, etc.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A resonant converter power supply comprising:
an input for receiving an input voltage from a voltage source;
an output for providing an output voltage to a load;
a transformer having a primary winding and a secondary winding;
a bridge circuit coupled between the input and the primary winding of the transformer, the bridge circuit including a first switch and a second switch;
a first rectifier rail coupled between the secondary winding of the transformer and the output;
a second rectifier rail coupled between the secondary winding of the transformer and the output;
at least one sensor coupled to generate an error signal representing a difference between currents in the first rectifier rail and the second rectifier rail; and
a controller configured to receive the error signal, and increase or decrease a duty cycle of the first switch relative to a duty cycle of the second switch based on the received error signal to reduce the difference between the currents in the first rectifier rail and the second rectifier rail.

2. The power supply of claim 1, wherein the controller is configured to adjust the duty cycle of only the first switch based on the received error signal.

3. The power supply of claim 1, wherein the controller is configured to adjust both the duty cycle of the first switch and the duty cycle of the second switch based on the received error signal.

4. The power supply of claim 1, wherein the controller is configured to, prior to increasing or decreasing the duty cycle of the first switch, operate the first switch and the second switch with substantially identical duty cycles.

5. The power supply of claim 1, wherein the at least one sensor is coupled to sense a peak rectified current of the first rectifier rail and a peak rectified current of the second rectifier rail, and the error signal incudes a difference between the respective sensed peak rectified currents of each rectifier rail.

6. The power supply of claim 1, wherein the at least one sensor is located on a secondary side of the power supply and the controller is located on a primary side of the power supply, the power supply further comprising an isolator coupled between the at least one sensor and the controller.

7. The power supply of claim 1, wherein the resonant converter is an LLC resonant converter including at least one inductor and at least one capacitor coupled between the bridge circuit and the transformer.

8. The power supply of claim 1, wherein the bridge circuit comprises a half bridge circuit.

9. The power supply of claim 1, wherein the bridge circuit comprises a full bridge circuit.

10. The power supply of claim 1, wherein the first rectifier rail includes at least one first rectifier diode, and the second rectifier rail includes at least one second rectifier diode.

11. The power supply of claim 1, wherein the at least one sensor includes a current transformer.

12. The power supply of claim 1, wherein the controller comprises a digital signal processor.

13. A resonant converter power supply comprising:
an input for receiving an input voltage from a voltage source;
an output for providing an output voltage to a load;
a transformer having a primary winding and a secondary winding;
a bridge circuit coupled between the input and the primary winding of the transformer, the bridge circuit including a first switch and a second switch;
a first rectifier rail coupled between the secondary winding of the transformer and the output;
a second rectifier rail coupled between the secondary winding of the transformer and the output;
at least one sensor coupled to sense a magnetizing current of the primary winding of the transformer, and to generate an error signal representing unbalanced currents in the first rectifier rail and the second rectifier rail, the error signal including a DC offset of the sensed magnetizing current of the primary winding of the transformer; and
a controller configured to receive the error signal and adjust a duty cycle of at least one of the first switch and the second switch based on the received error signal to reduce the unbalanced currents in the first rectifier rail and the second rectifier rail.

14. The power supply of claim 13, wherein the controller is configured to measure a magnitude of the magnetizing current of the primary winding of the transformer at a specified delay period after turn on of at least one of the first switch and the second switch.

15. A method of reducing unbalanced current in a resonant converter power supply, the power supply including an input for receiving an input voltage from a voltage source, an output for providing an output voltage to a load, a transformer having a primary winding and a secondary winding, a bridge circuit coupled between the input and the primary winding of the transformer and including a first switch and a second switch, a first rectifier rail coupled between the secondary winding of the transformer and the output, and a second rectifier rail coupled between the secondary winding of the transformer and the output, the method comprising:

sensing unbalanced currents in the first rectifier rail and the second rectifier rail;

generating an error signal representing the sensed a difference between currents in the first secondary rail and the second rectifier rail; and increasing or decreasing a duty cycle of the first switch relative to a duty cycle of the second switch based on the error signal to reduce the difference between the currents in the first rectifier rail and the second rectifier rail.

16. The method of claim 15, wherein increasing or decreasing the duty cycle includes increasing or decreasing the duty cycle of only the first switch based on the error signal.

17. The method of claim 15, wherein increasing or decreasing the duty cycle includes adjusting both the duty cycle of the first switch and the duty cycle of the second switch based on the error signal.

18. The method of claim 15, further comprising, prior to increasing or decreasing the duty cycle of the first switch, operating the first switch and the second switch with substantially identical duty cycles.

19. The method of claim 15, wherein sensing includes sensing a peak rectified current of the first rectifier rail and a peak rectified current of the second rectifier rail, and the error signal includes a difference between the respective sensed peak rectified currents of each rectifier rail.

20. The method of claim 15, wherein sensing includes sensing a magnetizing current of the primary winding of the transformer, and the error signal includes a DC offset of the sensed magnetizing current of the primary winding of the transformer.

21. The method of claim 20, wherein sensing includes measuring a magnitude of the magnetizing current of the primary winding of the transformer at a specified delay period after turn on of at least one of the first switch and the second switch.

* * * * *

UNITED STATES PATENT AND TRADEMARK OFFICE
CERTIFICATE OF CORRECTION

PATENT NO. : 10,886,855 B2
APPLICATION NO. : 16/086245
DATED : January 5, 2021
INVENTOR(S) : Yongtao Xie et al.

Page 1 of 1

It is certified that error appears in the above-identified patent and that said Letters Patent is hereby corrected as shown below:

On the Title Page

Item (57) In Line 11 of the Abstract, replace "ails" with --rails--

Signed and Sealed this
Sixteenth Day of November, 2021

Drew Hirshfeld
*Performing the Functions and Duties of the*
*Under Secretary of Commerce for Intellectual Property and*
*Director of the United States Patent and Trademark Office*